United States Patent [19]

Caron et al.

[11] Patent Number: 4,915,072
[45] Date of Patent: Apr. 10, 1990

[54] ELECTRONIC GOVERNOR INTERFACE MODULE

[75] Inventors: Laverne A. Caron, Naperville; Maciej Labowicz, Elk Grove Village, both of Ill.

[73] Assignee: Navistar International Transporation Corp., Chicago, Ill.

[21] Appl. No.: 219,013

[22] Filed: Jul. 14, 1988

[51] Int. Cl.⁴ .................................. F02M 39/00
[52] U.S. Cl. .................... 123/357; 123/494; 73/119 A
[58] Field of Search .............. 123/357, 358, 359, 494, 123/381; 73/119 A

[56] References Cited

U.S. PATENT DOCUMENTS

| | | | |
|---|---|---|---|
| 3,718,123 | 2/1973 | Eckert | 123/357 |
| 4,531,491 | 7/1985 | Iiyama | 123/357 |
| 4,538,571 | 9/1985 | Buck | 123/357 |
| 4,559,816 | 12/1985 | Ebert | 73/119 A |
| 4,700,143 | 10/1987 | Anthony | 123/357 |
| 4,708,112 | 11/1987 | Nanjyo | 123/357 |
| 4,766,863 | 8/1988 | Fujimori | 123/357 |
| 4,798,084 | 1/1989 | Takahashi | 73/119 A |

FOREIGN PATENT DOCUMENTS

| | | | |
|---|---|---|---|
| 0204941 | 11/1983 | Japan | 123/357 |
| 2062253 | 5/1981 | United Kingdom | 123/357 |
| 2062254 | 5/1981 | United Kingdom | 123/357 |

*Primary Examiner*—Carl Stuart Miller
*Attorney, Agent, or Firm*—F. David AuBuchon; Dennis K. Sullivan

[57] ABSTRACT

An electronic module interfaces a microcomputer with the fuel injection equipment of a diesel engine so that the microcomputer, acting through the module, exercises control over the fuel injected into the engine. A pulse width modulated fuel deliver control signal issued by the microcomputer is transmitted through the module to energize a proportional solenoid actuator that positions the fuel rack. Rack position is sensed by an eddy current sensor that provides feedback through the module to the microcomputer so that the rack position is closed-loop controlled. The sensor has a measurement coil for measuring rack position and a reference coil for temperature compensation. The two coils are connected in a circuit of the module that produces a pulse width modulated feedback signal which is supplied to the microcomputer in synchronism with the fuel deliver control signal. This latter circuit comprises an L/R monostable for each coil and pulse stretchers that stretch the output pulses from the monostables. The pulse stretchers' outputs are supplied to a gate that develops the feedback signal to the microcomputer.

21 Claims, 3 Drawing Sheets

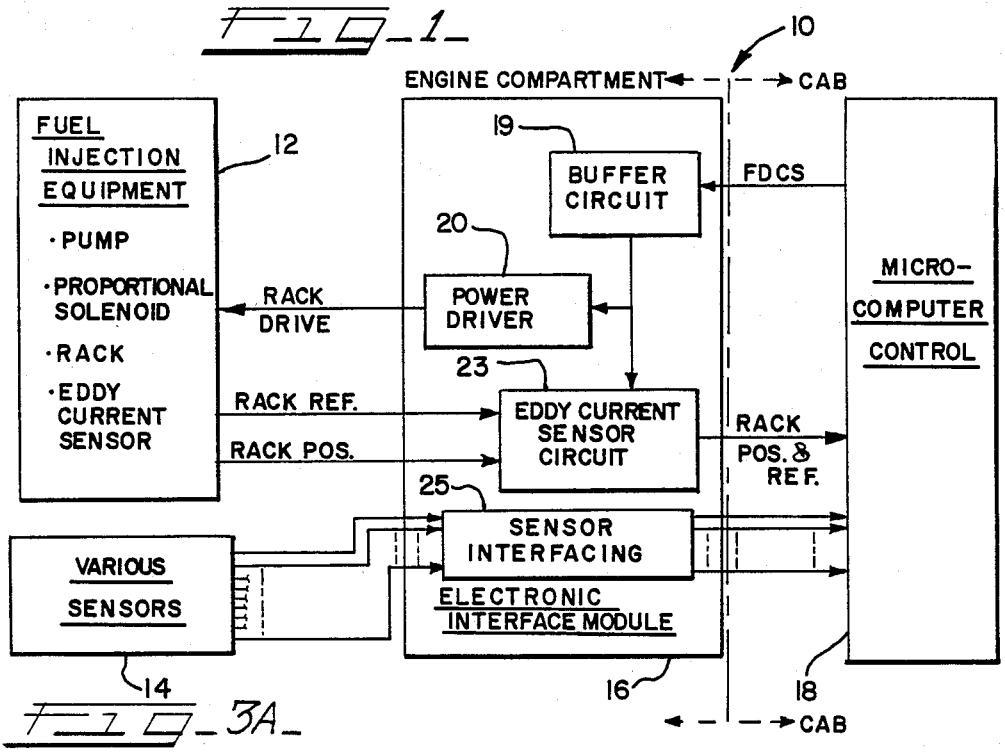
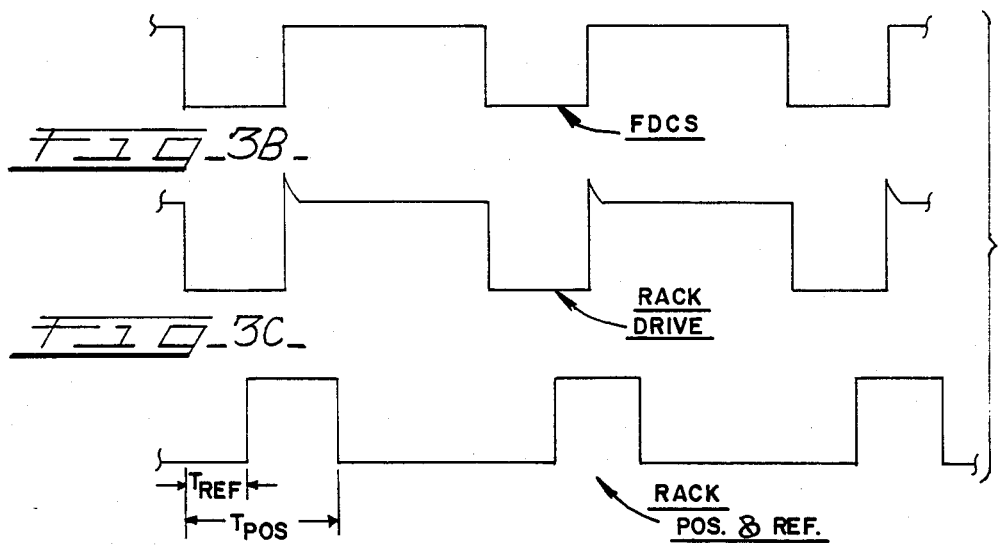

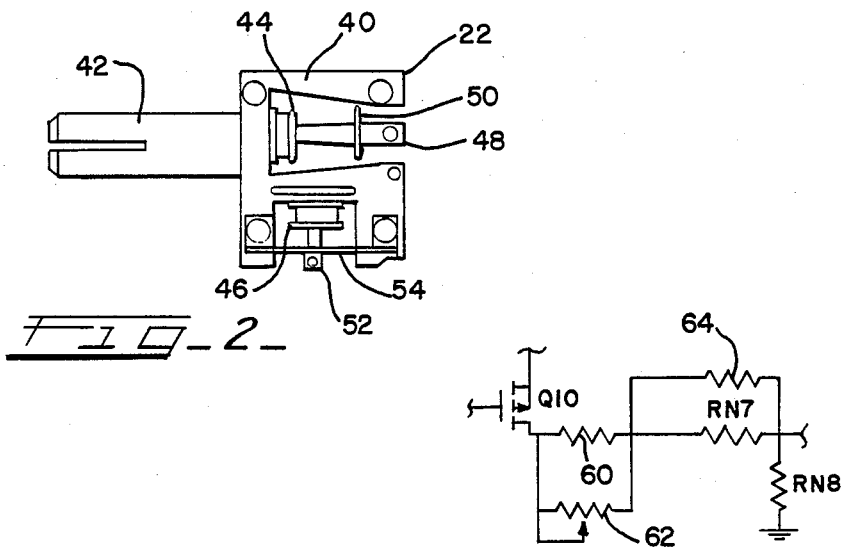
FIG-2-
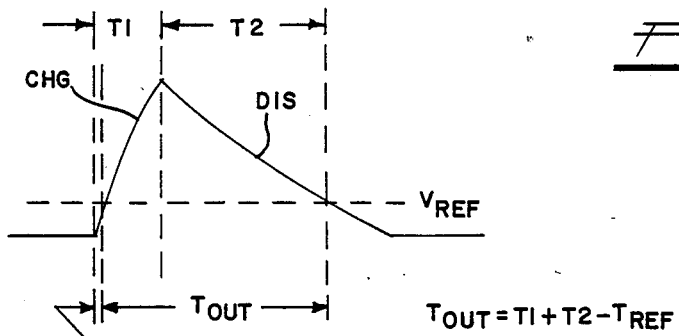
FIG-6-
$$T_{OUT} = T1 + T2 - T_{REF}$$
$$T_{REF} = -\frac{RN5 \cdot C7}{\left(1 + \frac{RN5}{RN6}\right)} \ln\left[1 - \frac{RN10\left(1 + \frac{RN5}{RN6}\right)}{RN9 + RN10}\right]$$
$$T2 = RN6 \cdot C7 \ln\left[\frac{RN10\left(1 + \frac{RN5}{RN6}\right)}{(RN9 + RN10)\left(1 - e^{-\frac{T1\left(1 + \frac{RN5}{RN6}\right)}{RN5 + C7}}\right)}\right]$$
FIG-5-

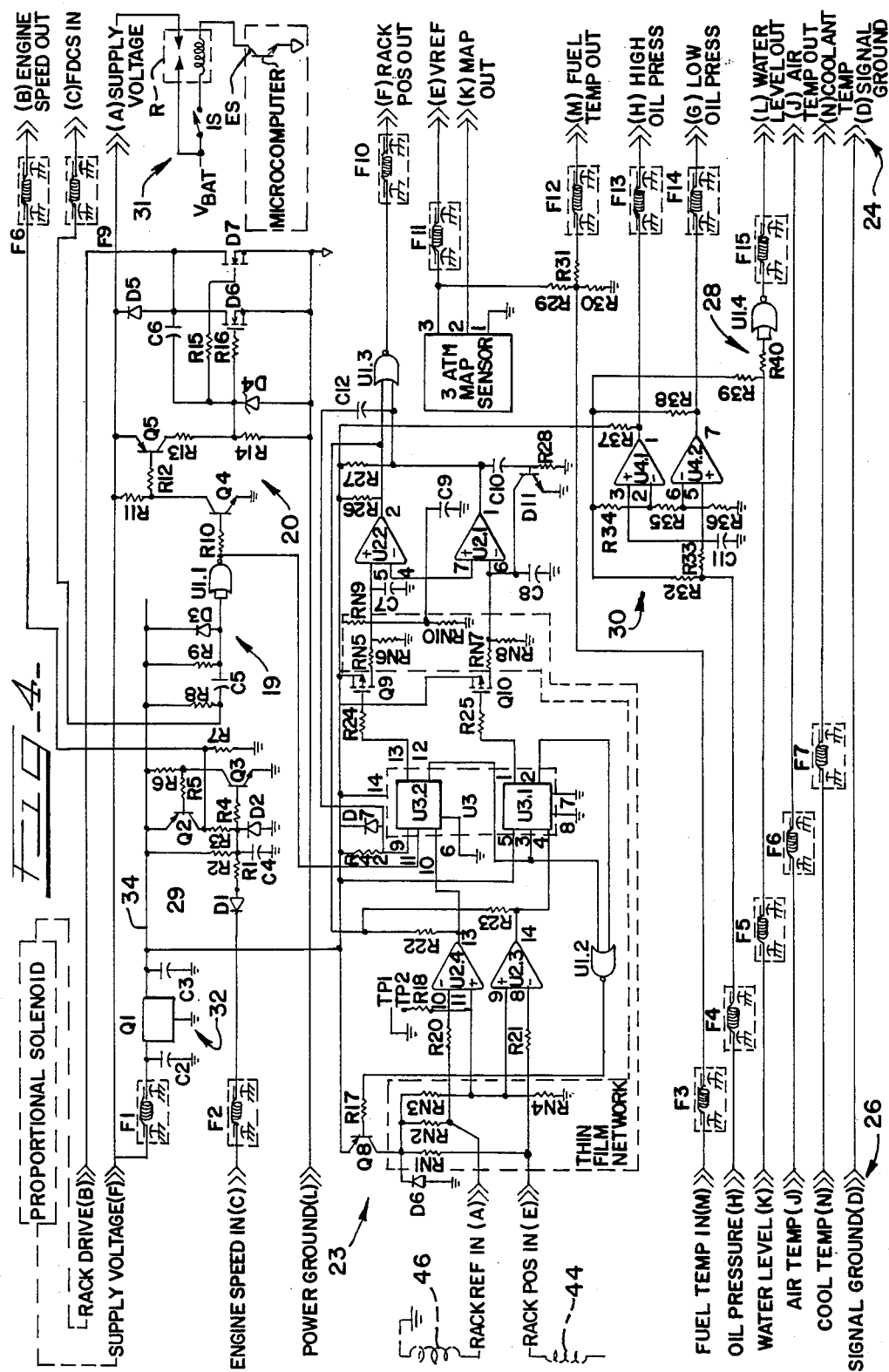

ELECTRONIC GOVERNOR INTERFACE MODULE

BACKGROUND AND SUMMARY OF THE INVENTION

This invention relates generally to electronic governors for internal combustion engines. More specifically the invention relates to a new and unique electronic interface for interfacing the governor to a microcomputer in such a manner that the microcomputer, acting through the interface, exercises closed loop control over the governor.

Electronic controls can be used to operate the fuel injection equipment of a diesel engine in a manner that provides better performance than that which is attainable with older technology of the type employing flyweight governors, mechanical stops and aneroids. One particular implementation of an injection system that is electronically controlled includes replacing the mechanical rack actuating mechanism and stops of an inline jerk-pump with a microcomputer-controllable proportional solenoid actuator assembly. This assembly comprises an actuator that is positioned in accordance with the extent to which its solenoid is energized. The proportional solenoid is selectively energized in accordance with the fuel deliver control signal to in turn selectively position the fuel rack via the actuator, and correspondingly modulate the fuel flow from the injection pump into the engine.

A feedback loop is closed around the proportional solenoid actuator. It includes an eddy current device which has a measuring coil that senses the rack position and feeds this information back to the microcomputer. Because the eddy current device is temperature-sensitive, a separate reference coil is located in proximity to the measuring coil, and a signal derived from this reference coil is used to modify the signal derived from the measuring coil so that the signal fed back to the microcomputer can be temperature-compensated.

In conventional implementations of this type of system, analog electrical signals from the sensor are supplied to the microcomputer, or microprocessor, which must then convert them into digital form for use in carrying out the necessary computations. The computations of the microcomputer are converted into an appropriate control signal for operating the proportional solenoid.

Because the fuel injection equipment of a diesel engine is located on the engine, placement of the microcomputer in proximity to the injection equipment poses a problem. The temperature sensitive nature of LSI (large scale integration) microelectronic circuitry, that is typical of a microcomputer, makes such placement undesirable unless elaborate thermal protection provisions are employed for it. Yet, if the microcomputer is remotely located in a less hostile area where less elaborate protection is required, analog signals must be transmitted to and from the injection equipment over conductors which may be exposed to electrical interference or noise adversely affecting the analog signals. Thus, these contradictory objectives beset the implementation of a microcomputer control for an electronic engine governor mechanism.

The present invention relates to a novel and unique approach for providing microcomputer control of an electronic engine governor in a way which overcomes the aforementioned difficulties. This approach is embodied in an electronic interface module that is provided between the microcomputer and the fuel injection equipment. The module is constructed for the most part of discrete electronic components and is constructed and packaged in a manner such that it can be mounted in close proximity to the fuel injection equipment without serious detriment. At the same time the microcomputer can be placed in a less hostile environment where temperature ranges and conditions are typically not as extreme as in proximity to the engine. Moreover, the interface module comprises circuits that provide for the transmission of signals between itself and the microcomputer that are digital rather than analog in nature, so that electrical noise that may be picked up by the wiring which connects the module with the microcomputer has a less detrimental effect on the signals than if they were analog.

A further feature of the invention relates to the manner in which the electronic circuitry of the interface module is arranged to interact with the proportional solenoid and the eddy current sensor. Although pulse width modulation of the proportional solenoid is not broadly novel, one of the unique features of the invention is that the eddy current sensor is connected in pulse width modulating circuitry that produces sensor information as a pulse width modulated signal. In particular the pulse width modulated eddy current sensor signal is synchronized with the pulse width modulated fuel deliver signal that operates the proportional solenoid. In other words, the present invention, through this novel interface module, provides from the eddy current sensor to the microcomputer relatively noise immune digital feedback which is synchronized with the relatively noise immune pulse width modulated fuel deliver control signal issued from the microcomputer to the proportional solenoid.

A still further feature involves the use of pulse stretcher circuitry in the interface module that stretches the pulse width modulated signal from the eddy current sensor. By so stretching this signal, and supplying the stretched signal directly to the microcomputer, the microcomputer can read the signal by using it to gate a counter for counting clock pulses. This improves the resolution of reading the feedback signal and enhances the ultimate accuracy of the system in comparison to prior systems. Pulse stretchers are used with both the reference coil and the measuring coil of the eddy current sensor so that the waveform to the microcomputer comprises two stretched components, one for the measurement coil, the other for the reference coil.

The stretching of the respective pulses derived from the measurement coil and the reference coil respectively is performed in such a manner that the stretched reference pulse component of the signal to the microcomputer is always in a predetermined relationship to the stretched measurement pulse component. This relationship can even be achieved where the unstretched pulse relationships are not always necessarily consistent. For example, while the unstretched measurement pulse will normally be wider than the unstretched reference pulse, certain conditions may result in the unstretched reference pulse being wider. In such a case, consistency in the relationship of the stretched pulses is attained by stretching the reference pulse and the measurement pulse by different factors. The microcomputer performs the necessary computation on the two stretched pulse signal components so that temperature influences which could adversely affect the reading are compensated for in the fuel deliver control signal that is issued to the governor.

The foregoing features, advantages, and benefits of the invention, along with the additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIG. 1 is a generalized block diagram of an engine fuel injection system that embodies the electronic control of the present invention.

FIG. 2 is a longitudinal view of a sensor that is used in the preferred implementation of the invention.

FIGS. 3A, 3B, 3C are generalized waveforms illustrative of various signals occurring at various points in the block diagram of FIG. 1 for purposes of explanation.

FIG. 4 is a detailed electronic schematic diagram of one of the blocks of FIG. 1 by itself.

FIG. 5 is a diagram that is useful in explaining certain details of the operation of the circuit of FIG. 4.

FIG. 6 is a partial schematic diagram of a modification to one portion of the circuit.

DESCRIPTION OF THE PREFERRED EMBODIMENT

FIG. 1 schematically portrays a diesel engine fuel injection system 10 that embodies principles of the present invention. A diesel engine is often used to power an automotive vehicle such as a truck, and the application of the present invention will be described for that use. The electromechanical fuel injection equipment is designated by the general reference numeral 12 and comprises a fuel injection pump, a rack, a proportional solenoid actuator, and an eddy current sensor. Various sensors designated by the general reference numeral 14 are also mounted on the engine.

An electronic interface module, 16 generally, interfaces fuel injection equipment 12 and the various sensors 14 with a microcomputer control 18. The electronic interface module 16 is disposed in the truck's engine compartment in proximity to fuel injection equipment 12 and the various sensors 14. The microcomputer control 18 is located in a less hostile environment, such as at a suitable location inside the truck's cab.

Briefly, microcomputer control 18 acts upon various input signals to develop an output control signal called the Fuel Deliver Control Signal (FDCS). The FDCS signal is a pulse width modulated one whose degree of modulation represents the amount of fuel that should be delivered to the engine at each injection of fuel from injection equipment 12. FIG. 3A portrays a representative waveform shape for the FDCS signal.

Inside electronic interface module 16, the FDCS signal operates, via a buffer circuit 19, a power driver circuit 20 that is used to position the fuel rack and in turn cause the correct amount of fuel to be delivered to the engine at each injection. The electro-mechanical means of positioning the rack is the proportional solenoid actuator that is a part of fuel injection equipment 12, and for purposes of description, the signal that is delivered from module 16 to the solenoid portion of the proportional solenoid actuator is referred to as the rack drive signal.

FIG. 3B portrays the representative rack drive signal that is in response to the FDCS of FIG. 3A. The two signals of FIGS. 3A and 3B are essentially identical in both frequency and pulse width except for the presence of an inductive kick spike at the trailing edge of each the rack drive pulse due to deenergization of the solenoid portion of the proportional solenoid actuator.

The control of the rack position is of a closed loop character, and therefore feedback from the rack is transmitted through module 16 to microcomputer control 18. The sensor that provides the feedback information is the eddy current sensor 22 that is portrayed by itself in FIG. 2. Before describing details of the sensor it may be noted that there are two components to the rack feedback signal: one, the rack position measurement signal, and two, the rack reference signal, both of which are identified in FIG. 1. Briefly, the rack position measurement signal is a signal that is indicative of an actual measurement of rack position while the rack reference signal is a signal that is used to temperature-compensate the rack position signal. Although the rack position signal and the rack reference signal are two separate and distinct inputs to module 16 from fuel injection equipment 12, they are supplied via a single circuit from module 16 to microcomputer control 18. FIG. 3C portrays an illustrative shape for the rack reference and rack position signals. Module 16 contains an eddy circuit sensor circuit 23 that interfaces the sensor with the microcomputer. As will be explained in more detail later, the feedback signal from the sensor and circuit 23 is synchronized with the FDCS signal via triggering of circuit 23 from buffer circuit 19.

Microcomputer control 18 acts upon the feedback information concerning the rack position to develop an appropriate rack drive signal for assuring that the rack is positioned to cause the correct amount of fuel to be injected into the engine irrespective of variations in temperature and other parameters, such as those which are monitored by the various sensors 14 and transmitted through interface module 16 back to microcomputer control 18 via sensor interfacing circuitry, 25 generally in FIG. 1. In this regard the microcomputer control is programmed by conventional programming techniques in accordance with the appropriate fuel injection schedules based on values of the various sensed parameters and the command input.

A fuller understanding of principles of the invention can be obtained by referring to the following detailed description of FIGS. 4 and 5. FIG. 4 is presented with a number of terminals along the right side and a number along the left side. Those along the right provide for connection of module 16 to microcomputer control 18 via a connector 24 on the module while those along the left provide for connection of module 16 to fuel injection equipment 12 and the various sensors 14 via a connector 26 on the module.

The air temperature and coolant temperature information from the respective air temperature and coolant temperature sensors is transmitted directly through module 16 to microcomputer control 18. A circuit 28 that comprises resistors R39, R40 and a gate U1.4 connected as illustrated is used to convert a low level signal from the water level sensor into a logic signal. The oil pressure signal is converted by a conversion circuit 30 to provide a high oil pressure signal when the engine oil pressure exceeds a certain high threshold limit and a low oil pressure signal when the engine oil pressure falls below a certain low threshold limit. The fuel temperature signal is fed through a resistor network consisting of resistors R29, R30 and R31 connected as illustrated. A MAP sensor is mounted on module 16 and provides to microcomputer control 18 a signal indicative of barometric pressure. The engine speed signal from the engine speed sensor is fed to a conditioning circuit 29 comprising two transistors Q2, Q3, resistors R1 through R6 inclusive, diodes D1, D2, and a capacitor C4 connected as illustrated. The output from this circuit supplies an engine speed signal that is conditioned for microcomputer 18. Having described those portions of module 16 that are associated with the various sensors 14, attention can now be directed to the details of module 16 that more directly involve the control of fuel injection equipment 12.

Battery voltage is delivered via a circuit 31 to the A terminal of connector 24 on module 16. The A terminal feeds through to the F terminal of connector 26 which in turn feeds the proportional solenoid. Circuit 31 exercises supervisory control over the delivery of D.C. power to the proportional solenoid for driving the rack by removing the power should the output drive stage of module 16, which as will become more apparent from later description modulates the power to the proportional solenoid, short circuit.

Circuit 31 comprises the ignition switch IS, the coil of a relay R, and an electronic switch ES of the microcomputer, all connected in series across the battery voltage. When switches IS and ES are closed, the coil of relay R is energized. This in turn closes the contacts of relay R to cause power to be supplied via module 16 to terminal F. Power to the proportional solenoid is discontinued either by turning the ignition switch off, or by the microcomputer opening switch ES. Because the microcomputer monitors various engine operating parameters, it is effective to open switch ES when a condition indicative of a short in the output drive stage of module 16 occurs. An example of such a condition would be an excessively overrunning engine.

Since the battery voltage that is delivered to module 16 at terminal A of connector 24 is too high for certain of the circuits contained in the module, a voltage reducing power supply 32 consisting of Q1, C2 and C3 connected as illustrated is provided in module 16. This provides a reduced supply voltage at line 34 for certain of the module's circuits. The FDCS signal input from microcomputer control 18 is supplied to module 16 at terminal C of connector 24.

The FDCS signal is supplied as an input to buffer circuit 19 that consists of resistors R8, R9, capacitor C5, diode D3, and gate U1.1 connected as illustrated. The output of the buffer circuit is provided at the output of gate U1.1 and is coupled both to power driver stage 20 for the rack drive and to eddy current sensor circuit 23 that is associated with eddy current sensor 22.

Power driver stage 20 comprises a first transistor stage (Q4, R10, R11), a second transistor stage (R12, Q5, R13, R14), and a power driver circuit (D4, D5, R15, R16, C6, Q6, Q7) connected as illustrated. FIG. 3A portrays the FDCS signal as consisting of negative-going pulses whose widths are being modulated. Each pulse has a negative-going leading edge and a positive-going trailing edge, and its width represents a state of conduction that causes an energizing pulse to be delivered to the proportional solenoid. When a pulse of FDCS is given, the negative-going leading edge is coupled through capacitor C5 to switch the state of gate U1.1. This switching of gate U1.1 in turn sends a triggering signal to eddy current sensor circuit 23 and also to transistor circuit Q4 switching this latter circuit into conduction. Correspondingly, transistor Q5 is switched into conduction causing transistors Q6 and Q7 to switch into conduction, pulling down on the rack drive line, which causes an energizing pulse to be delivered to the proportional solenoid, shown in phantom in FIG. 4. When the FDCS pulse terminates, the transistor circuits, Q4, Q5, Q6, Q7 become non-conductive.

The rack drive signal therefore is essentially a duplicate of the FDCS signal in frequency and pulse width except for the effect of the inductive kick previously described. Modulation of the width of the FDCS signal will produce a corresponding modulation of the width of the pulses of the rack drive signal to in turn produce a corresponding change in the extent of energization of the proportional solenoid and hence ultimately the rack position and amount of fuel injected into the engine.

The remainder of FIG. 4 comprises eddy current sensing circuit 23 and before that circuit is described in detail, attention is directed to FIG. 2 for a description of the eddy current sensor itself.

The sensor comprises a framework 40 to which is attached a mounting arm 42 for mounting of the sensor in proper position for sensing rack position. The measuring coil and reference coils are designated by the respective reference numerals 44 and 46. A measuring core arm 48 and a measuring shading ring 50 are disposed in association with measuring coil 44 while a reference core arm 52 and a reference shading ring 54 are disposed in association with reference coil 46. The reference coil and its core arm and shading ring are fixedly mounted on the framework 40. The measuring shading ring 50 is positionable on the measuring core arm 48 relative to measuring coil 44 in accordance with rack position. In this way, the inductance of measuring coil 44 can provide a signal indicative of rack position. However, because of the temperature sensitivity which is inherent in the device, the inductance of reference coil 46 provides a reference signal that is used to temperature compensate the rack position signal as measured by the signal from measuring coil 44. Actual signals from the respective coils 44, 46 are obtained by connecting the coils in respective circuits of the eddy current sensor circuit 23 that is a part of module 16.

Returning to FIG. 4, the inputs to circuit 23 from sensor 22 are via terminals A and E of connector 26. Each coil is connected in a corresponding L/R monostable circuit and FIG. 4 shows the connection of each coil in phantom. The monostable circuit that is associated with measuring coil 44 comprises a resistor RN1 and a comparator U2.3. The monostable circuit that is associated with reference coil 46 comprises a resistor RN2 and a comparator U2.4. Each coil is connected in series with its corresponding resistor, and each coil-resistor (L/R) series circuit is connected across the reduced voltage power supply through a PNP transistor Q8 that is periodically switched into conduction to cause each monostable circuit to pulse. The exact manner in which transistor Q8 is operated will become more apparent from later description. For the moment suffice it to say that when transistor Q8 is switched into conduction each L/R circuit will execute an exponential transient. For the rack position monostable circuit, the L/R transient voltage at the junction of the coil and resistor is supplied through resistor R21 to the inverting input of comparator U2.3 while for the rack reference monostable circuit, the transient is supplied through resistor R20 to the inverting input of comparator U2.4.

A common reference signal is supplied to the non-inverting input of each comparator and is derived from a voltage divider consisting of the series-connected resistors RN3, RN4 that connect across the reduced voltage power supply through transistor Q8. Hence when transistor Q8 is switched into conduction to cause the two L/R circuits to execute their respective transients, the common reference threshold voltage signal is simultaneously supplied to the non-inverting inputs of the comparators U2.3, U2.4.

The output of each comparator U2.3, U2.4 is both pulled up to line S4 through its own resistor R22, R23, respectively, and the common resistor R26, and is also directly connected to the R input of a corresponding D type flip-flop U3.1 and U3.2 respectfully. The two flip-flops are two halves of a dual D type flip-flop U3. The quiescent condition of the circuit, meaning the condition when no FDCS pulses are being given, is such that transistor Q8 is off and flip-flops U3.1 and U3.2 are reset. In response to a leading edge of an FDCS pulse, flip-flop U3.2 is clocked via buffer circuit 19. This sets the flip-flop and because its Q-output is coupled to the clock input of flip-flop U3.1, the latter is also set. The C-outputs of both flip-flops are connected respectively to respective inputs of a gate U1.2 whose output is coupled through resistor R17 to the base of transistor Q8. Consequently in response to the leading edge of a pulse of the FDCS signal, both flip-flops U3.1, U3.2 are set, and essentially concurrently transistor Q8 is made conductive causing the two monostable circuits to be triggered.

Each comparator U2.3, U2.4 senses when the corresponding transient passes through the reference threshold level and at such time the output of the comparator changes state. This in turn causes each flip-flop to be reset. By making the reference threshold voltage a certain fraction of the voltage applied to each L/R circuit and by making the resistance of the series resistor much, much larger than the resistance of the coil winding, the duration for which each flip-flop is set is thereby made directly proportional to the inductance of the corresponding coil.

The Q complement output of each flip-flop is connected through a corresponding resistor R25, R24 to a corresponding P-channel enhancement mode mosfet Q9, Q10. The duration for which each mosfet Q9, Q10 is conductive is controlled by the duration for which the corresponding flip-flop is in the set condition. Since both monostable circuits are set in response to the leading edge of the FDCS signal, the duration for which each mosfet Q9, Q10 is in conduction is a function of the inductance of the corresponding coil, the measurement coil in the case of mosfet Q10, the reference coil in the case of mosfet Q9. In other words, the duration for which each mosfet is conductive represents the width of the corresponding pulse, i.e. duration of conduction of Q9 is the reference pulse width and duration of conduction of Q10 is the measurement pulse width.

For typical resistance and inductance in the described L/R circuits, the pulse width outputs of the mosfets Q9, Q10 will be too narrow to be read with good resolution by a microcomputer-based controller, which typically has a one microsecond to five microsecond resolve time. The relative parameters of the L/R circuits are such that a typical range for the measurement pulse width is 30 microseconds to 90 microseconds, and typical nominal value for the reference pulse width is 40 microseconds.

Therefore in accordance with a further aspect of the invention, pulse stretcher circuits are associated with the two mosfets Q9 and Q10 for stretching the respective pulses representing the rack reference and rack position signals respectively.

Over most of the operating range of the measurement sensor, the measurement pulse widths will exceed typical widths of the reference pulses. Hence, flip-flop U3.2 will usually be reset sooner by comparator U2.4 than will flip-flop U3.1 by comparator U2.3. Accordingly, mosfet Q9 will usually be switched out of conduction before mosfet Q10. However, under certain conditions, the width of the measurement pulse can be less than that of the reference pulse, and for these conditions, flip-flop U3.2 will reset later than flip-flop U3.1 so that mosfet Q10 will be switched out of conduction before mosfet Q9. If the unstretched pulses were to be stretched by the same factor, the stretched reference pulse would at certain times then be larger in width than the stretched measurement pulse. Where the microcomputer is configured to receive the stretched feedback signal with the stretched reference pulse component in a predetermined relationship to the stretched measurement pulse component, the possibility that the width of the stretched reference pulse can be either less than or greater than the width of the stretched measurement pulse, gives rise to a potential ambiguity insofar as the microcomputer is concerned. The pulse stretchers however can resolve, and therefore avoid, any such ambiguities.

The pulse stretcher circuit that is associated with mosfet Q9 comprises resistors RN5, RN6, a capacitor C7 and a comparator U2.2 connected as illustrated. Associated with mosfet Q10 is a pulse stretcher circuit which comprises resistors RN7, RN8, a capacitor C8 and a comparator U2.1 connected as illustrated. The output terminal of each comparator U2.2, U2.1 is pulled up to the reduced voltage power supply through a corresponding resistor R26, R27 respectively, and the two outputs further connect to respective inputs of a gate U1.3 which in turn connects to terminal F of connector 24. A reset circuit for the pulse stretchers comprises a capacitor C10, a resistor R28, and a transistor Q11 connected in circuit as illustrated.

Basically each pulse stretcher circuit operates by charging and discharging a capacitor. For stretching each rack reference signal pulse, capacitor C7 is charged with a relatively large current through resistor RN5 as mosfet Q9 conducts during each pulse of the rack reference signal. When each pulse terminates, so does conduction of mosfet Q9, and hence capacitor C7 ceases charging. Immediately, capacitor C7 now begins discharging through resistor RN6. By making the value of resistor RN6 much, much larger than that of resistor RN5, capacitor C7 will discharge at a much much slower rate than the rate at which it charged.

FIG. 5 graphically portrays the charging and discharging of capacitor C7, and the relevant mathematical relationships in terms of circuit components. The charge curve is designated CHG, and the discharge curve, DIS. T1 represents the unstretched input pulse width to mosfet Q9, and Tout represents the stretched output pulse width from comparator U2.2. Vref is the reference voltage that is supplied to the inverting input of U2.2. The stretching is equal to the ratio of Tout to T1. As noted on the face of FIG. 4, the resistors RN1 through RN10 are preferably a thin film network.

In view of the description of the pulse stretcher circuit for the rack reference pulses, it should be apparent that the pulse stretcher circuit for the rack position pulses is similiarly constructed. In other words, it stretches the rack position pulses in a similar manner to that in which the rack reference pulses are stretched by its pulse stretcher. There is however a significant difference.

The ratio of resistor RN8 to resistor RN7 is made different from the ratio of resistor RN6 to RN5 so that each pulse stretcher circuit stretches the corresponding pulses by a different factor. Specifically, the position pulses of mosfet Q10 are stretched by a larger multiplication factor than the multiplication factor by which the reference pulses of mosfet Q9 are stretched. In this way each stretched position pulse will always have a greater width than the corresponding stretched reference pulse, a consistency for which the microcomputer is adapted to read the feedback signal components. In the illustrated circuit the reference pulse width is multiplied by a factor of sixteen by its stretcher, and the position pulse width is multiplied by a factor of thirty-two by its stretcher.

The outputs of the two comparators U2.1, U2.2 are connected to respective inputs of a gate U1.3, and since the reference pulse always terminates before the position pulse, the output waveform from gate U1.3 appears as shown in FIG. 3C. Because the leading edge of the FDCS represents the beginning of the rack reference signal, microcomputer control 18 is able to distinguish the respective reference and position components of the sensor signal that it receives so that proper temperature compensation of the rack position signal by the rack reference signal is attained.

The frequencies of the rack reference and rack position signals will be the same because the two monostable circuits are commonly triggered by the frequency of the FDCS signal. Since the rack reference pulse will be comparatively short in relation to the period of the FDCS signal, capacitor C7 will be able to essentially fully discharge between rack reference pulses. Since the rack position pulse will be longer, it is desirable to provide the discharge circuit for capacitor C8, consisting of capacitor C10, resistor R28, and NPN transistor Q11 connected as illustrated. The discharge circuit operates to momentarily make transistor Q11 conductive after the stretched rack position pulse has terminated. If there were concern about capacitor C7 not being fully discharged it should be obvious that provision could be made for shorting it in the same way as well.

Assurance that capacitor C7 will always charge faster than capacitor C8 is attained by the manner in which the two mosfets Q9, Q10 are switched on by the dual D type flip-flop U3. By using the Q output of U3.2 to clock U3.1, the resetting of the Q complement output of U3.1 is delayed slightly from the resetting of the Q complement output of U3.2, thereby causing mosfet Q9 to begin conducting slightly earlier than mosfet Q10.

A circuit that comprises a capacitor C12, a diode D7, and a resistor R42 is coupled between the output of comparator U2.1 and the D input of flip-flop U3.2. While resistor R42 normally keeps the D input pulled up so that it is high, the effect of diode D7 and capacitor C12 is to temporarily disable, or pull down, the D input to guard against potential spurious re-triggering, and hence guard against disruption of a reading of the sensor that is in process mainly due to the inductive kickback when Q6 and Q7 are turned off.

The connection of the output of comparator U2.2 to the outputs of comparators U2.3 and U2.4 respectively by the respective resistors R23 and R22 allows the unstretched pulse width measurement circuitry to be properly initialized each time that the sensor coils are to be read. Because the monostable circuits become operational only upon transistor Q8 being switched into conduction, the voltage conditions at the inputs to comparators U2.3, U2.4 are unknown at the time Q8 turns on. Because the output of comparator U2.2 will be low at the beginning of a sensor reading, its coupling to the outputs of comparators U2.3 and U2.4 via resistors R23 and R22 respectively holds the outputs of U2.3 and U2.4 low during the initialization so that flip-flops U3.1 and U3.2 are thereby not prematurely reset. When the output of comparator U2.2 goes high, it serves as a pull-up to reset the two flip-flops U3.1 and U3.2, and they in turn, acting through gate U1.2 shut off transistor Q8, terminating the current flow in the two L/R circuits in the process.

The interface module enables the microcomputer to exercise full control over the engine governor so that programming of the microcomputer determines governor operation. As noted above, the programming of the microcomputer is written in accordance with known procedures to impliment desired operating schedules. The microcomputer can be remote from the engine and interface module, and information can be transmitted between the microcomputer and module in digital form. Since the module is proximate the engine, certain obvious safeguards are of course taken, including adequate environmental packaging against adverse thermal, mechanical, and electromagnetic influences. In regard to the latter, suitable noise filters, or shielding, such as portrayed on the various signal lines in the schematic of FIG. 4 may be employed in the module. The components of the interface module are conventional and are selected in accordance with conventional electronic design engineering practices.

FIG. 6 shows a circuit that comprises a resistor 60 and a potentiometer 62, and a resistor 64 located between mosfet Q10 and resistors RN7 and RN8, as illustrated. The components 60, 62, 64, RN7, and RN8 cooperate to set the stretching factor for the position measurement pulse. The setting of potentiometer 62 is used to set a desired stretching factor, and hence it performs a calibration function. The intended purpose of the calibration that is performed by potentiometer 62 is to compensate for engine-to-engine variability and to provide a means for setting engine output horsepower at the end of the assembly line.

While a presently preferred embodiment of the invention has been disclosed, it will be appreciated that principles are applicable to other embodiments.

What is claimed is:

1. In an internal combustion engine which has a governor that comprises a fuel control mechanism which includes a fuel injection pump, a proportional solenoid actuator, having a solenoid portion and an actuator portion, for selectively modulating fuel flow from the injection pump to the engine by selectively positioning said actuator portion in accordance with a solenoid-energizing signal that is delivered to said solenoid portion, and a sensor for sensing position of said actuator portion, the improvement which comprises a microcomputer control for operating said governor through an electronic interface between the two, said electronic interface serving to interface the microcomputer control in closed loop control of said governor by causing said actuator portion to be positioned in accordance with a pulse width modulated fuel deliver control signal issued by said microcomputer control, said electronic interface comprising means to cause the solenoid-energizing signal to be pulse width modulated in the same fashion as said fuel deliver control signal, and means to couple said sensor to the microcomputer control in a feedback circuit which comprises means to create and deliver to the microcomputer control a pulse width modulated feedback signal that is indicative of the position of said actuator portion and that is synchronized in phase in a predetermined manner with the pulse width modulated solenoid-energizing signal delivered to said solenoid portion, in which said sensor is an eddy current sensor characterized by a parameter that can influence the sensor's accuracy, said eddy current sensor comprising a reference coil for correlating change in said parameter affecting sensor accuracy and a measuring coil for measuring the position of said actuator portion, means connecting each coil in a corresponding L/R monostable circuit, and means for triggering both L/R monostable circuits in predetermined relationship to the fuel deliver control signal to cause said monostable circuits to produce respective output pulses representing a reference signal and a measurement signal respectively, and means for deriving said feedback signal from said reference and measurement signals, and said electronic interface comprises a buffer circuit that receives the fuel deliver control signal as an input and a power driver circuit that is operated through said buffer circuit by the fuel deliver control signal, and said means for triggering both L/R monostable circuits in predetermined relationship to the fuel deliver control signal comprises means for triggering said last-mentioned circuits via said buffer circuit in response to a leading edge portion of each pulse of the fuel deliver control signal.

2. The improvement set forth in claim 1 in which said feedback circuit further includes for each L/R monostable circuit, a pulse stretcher circuit for causing the pulses of the pulse width modulated feedback signal that is supplied to the microcomputer control to have been stretched in comparison to the output pulses of said monostable circuits.

3. The improvement set forth in claim 2 in which the pulse stretcher circuit for the L/R monostable circuit containing said measuring coil comprises means for stretching the pulses which it receives by a greater factor than does the L/R monostable circuit containing said reference coil for the pulses which it receives.

4. The improvement set forth in claim 2 in which outputs of said pulse stretcher circuits are supplied as inputs to respective inputs of a logic gate, the output pulses of the respective pulse stretcher circuits are of the same polarity, and wherein said logic gate comprises an output at which the pulse width modulated feedback signal is produced in such a manner that each pulse of the reference signal is subtracted in amplitude from a corresponding pulse of the measurement signal.

5. The improvement set forth in claim 2 in which each pulse stretcher circuit comprises its own capacitor that is quickly charged during the occurrence of a pulse from the corresponding monostable circuit and which is slowly discharged thereafter to perform the pulse stretching.

6. In an internal combustion engine which has a governor that comprises a fuel control mechanism which includes a fuel injection pump, a proportional solenoid actuator, having a solenoid portion and an actuator portion, for selectively modulating fuel flow from the injection pump to the engine by selectively positioning said actuator portion in accordance with a solenoid-energizing signal that is delivered to said solenoid portion, and a sensor for sensing position of said actuator portion, the improvement which comprises a microcomputer control for operating said governor through an electronic interface between the two, said electronic interface serving to interface the microcomputer control in closed loop control of said governor by causing said actuator portion to be positioned in accordance with a pulse width modulated fuel deliver control signal issued by said microcomputer control, said electronic interface comprising means to cause the solenoid-energizing signal to be pulse width modulated in the same fashion as said fuel deliver control signal, and means to couple said sensor to the microcomputer control in a feedback circuit which comprises means to create and deliver to the microcomputer control a pulse width modulated feedback signal that is indicative of the position of said actuator portion and that is synchronized in phase in a predetermined manner with the pulse width modulated solenoid-energizing signal delivered to said solenoid portion, in which said sensor is an eddy current sensor characterized by a parameter that can influence the sensor's accuracy, said eddy current sensor comprising a reference coil for correlating change in said parameter affecting sensor accuracy and a measuring coil for measuring the position of said actuator portion, means connecting each coil in a corresponding L/R monostable circuit, and means for triggering both L/R monostable circuits in predetermined relationship to the fuel deliver control signal to cause said monostable circuits to produce respective output pulses representing a reference signal and a measurement signal respectively, and means for deriving said feedback signal from said reference and measurement signals, and in which said feedback circuit comprises transient-creating circuit means for causing the execution of an exponential transient to be initiated in synchronism with each pulse of the fuel deliver control signal and the generation of a pulse output signal whose width is related to a predetermined change in value of the transient, said sensor exercising control over the rate of the transient and hence over the pulse width of said pulse output signal, and means for developing said pulse width modulated feedback signal from said pulse output signal.

7. The improvement set forth in claim 6 in which said feedback circuit further includes a pulse stretcher circuit receiving pulses of the pulse output signal of said transient-creating circuit means for stretching the widths of the pulses of the latter signal to substantially greater widths.

8. The improvement set forth in claim 6 in which said sensor is characterized by a parameter that can influence the sensor's accuracy, said sensor further includes a reference sensing portion that is influenced by said parameter in the same manner as is the accuracy of said sensor, said feedback circuit comprises a second transient-creating circuit means for causing the execution of an exponential transient to be initiated in synchronism with each pulse of the fuel deliver control signal and the generation of a reference pulse output signal whose pulse width is related to the value of said parameter, and a gate that has a pair of inputs each receiving as a corresponding input a corresponding signal which is derived from a corresponding one of said transient-creating circuits and an output which is coupled to the microcomputer control.

9. The improvement set forth in claim 8 in which said feedback circuit further includes for each transient-creating circuit means, a corresponding pulse stretcher circuit for receiving pulses of the corresponding pulse output signal of the corresponding transient-creating circuit means and for stretching the widths of the corresponding pulses to substantially greater widths.

10. The improvement set forth in claim 9 in which each pulse stretcher circuit comprises a capacitor that is quickly charged during each corresponding pulse that is generated by the corresponding transient-creating circuit means and thereafter is slowly discharged thereby providing the stretching of each pulse.

11. The improvement set forth in claim 9 in which the pulse stretcher circuit for the first-mentioned transient-creating circuit means comprises means for stretching the pulses which it receives by a greater factor than does the second transient-creating circuit means for the pulses which it receives.

12. In an internal combustion engine which has a governor that comprises a fuel control mechanism which includes a fuel injection pump, a proportional solenoid actuator, having a solenoid portion and an actuator portion, for selectively modulating fuel flow from the injection pump to the engine by selectively positioning said actuator portion in accordance with a solenoid-energizing signal that is delivered to said solenoid portion, and a sensor for sensing position of said actuator portion, the improvement which comprises a microcomputer control for operating said governor through an electronic interface between the two, said electronic interface serving to interface the microcomputer control in closed loop control of said governor by causing said actuator portion to be positioned in accordance with a pulse width modulated fuel deliver control signal issued by said microcomputer control, said electronic interface comprising means to cause the solenoid-energizing signal to be pulse width modulated in the same fashion as said fuel deliver control signal, and means to couple said sensor to the microcomputer control in a feedback circuit which comprises means to create and deliver to the microcomputer control a pulse width modulated feedback signal that is indicative of the position of said actuator portion and that is synchronized in phase in a predetermined manner with the pulse width modulated solenoid-energizing signal delivered to said solenoid portion, in which said sensor is an eddy current sensor characterized by a parameter that can influence the sensor's accuracy, said eddy current sensor comprising a reference coil for correlating change in said parameter affecting sensor accuracy and a measuring coil for measuring the position of said actuator portion, means connecting each coil in a corresponding L/R monostable circuit, and means for triggering both L/R monostable circuits in predetermined relationship to the fuel deliver control signal to cause said monostable circuits to produce respective output pulses representing a reference signal and a measurement signal respectively, said reference and measuring coils having respective operating ranges that under certain conditions cause the widths of the output pulses of the monostable circuit containing said measuring coil to exceed the widths of the output pulses of the monostable circuit containing said reference coil, and that under certain other conditions cause the widths of the output pulses of the monostable circuit containing said measuring coil to be less than the widths of the output pulses of the monostable circuit containing said reference coil, further including for each monostable circuit, a corresponding pulse stretcher circuit for receiving pulses of the corresponding pulse output signal of the corresponding monostable circuit and acting sequentially after the corresponding monostable circuit for stretching the widths of the corresponding pulses to substantially greater widths such that for all said certain conditions the width of a stretched pulse derived from the monostable circuit containing said measuring coil in response to a triggering thereof exceeds the width of a stretched pulse derived from the monostable circuit containing said reference coil in response to a corresponding triggering thereof, and means to develop said feedback signal from the stretched pulses of the respective pulse stretcher circuits.

13. In an internal combustion engine which has a governor that comprises a fuel control mechanism which includes a fuel injection pump, a proportional solenoid actuator, having a solenoid portion and an actuator portion, for selectively modulating fuel flow from the injection pump to the engine by selectively positioning said actuator portion in accordance with a solenoid-energizing signal that is delivered to said solenoid portion, and a sensor for sensing position of said actuator portion, the improvement which comprises a microcomputer control for operating said governor through an electronic interface between the two, said electronic interface serving to interface the microcomputer control in closed loop control of said governor by causing said actuator portion to be positioned in accordance with a fuel deliver control signal issued by said microcomputer control, said electronic interface comprising means to cause the solenoid-energizing signal to be controlled by said fuel deliver control signal, and means to couple said sensor to the microcomputer control in a feedback circuit which comprises means to create and deliver to the microcomputer control a pulse width modulated feedback signal that is created by causing a pulse width modulation circuit which includes said sensor to execute an exponential transient and generate a pulse output signal whose width is representative of the position of said actuator portion and pulse stretcher circuit means operating sequentially after said pulse width modulation circuit to stretch the width of said pulse output signal.

14. The improvement set forth in claim 13 in which said electronic interface comprises means to issue said solenoid-energizing signal as a pulse width modulated signal, and said feedback circuit comprises means for causing the pulse width modulated feedback signal to be synchronized in phase in a predetermined manner with the pulse width modulated solenoid-energizing signal.

15. In an internal combustion engine which has a governor that comprises a fuel control mechanism which includes a fuel injection pump, an electrically controlled positionable actuator for selectively modulating fuel flow from the injection pump to the engine in accordance with a fuel deliver control signal, and an eddy current sensor having a measuring coil for sensing position of said actuator portion and a reference coil for use in temperature-compensation of the measuring coil, the improvement for interfacing said sensor with a microcomputer control that issues said fuel deliver control signal, said improvement comprising means coupling said reference coil in its own transient-creating and pulse width generating circuit means, means coupling said measuring coil in its own transient-creating and pulse width generating circuit means, means to cause both transient-creating and pulse width generating circuit means to execute respective exponential transients that result in the generation of respective output pulses whose respective pulse widths are correlated to the inductances of the respective coils, pulse stretcher circuit means operating sequentially after both said transient-creating and pulse width generating means to stretch the widths of the respective output pulses, and means to supply the respective stretched pulses to a microcomputer control.

16. The improvement set forth in claim 15 in which said means to cause both transient-creating and pulse width generating circuit means to execute respective exponential transients that result in the generation of respective output pulses whose respective pulse widths are correlated to the inductances of the respective coils comprises means to cause the execution of the respective exponential transients to be simultaneously initiated.

17. The improvement set forth in claim 16 in which said means to supply the respective stretched pulses to a microcomputer control comprises means to subtract the reference pulse signal from the measurement pulse signal at the beginning of a cycle of the transmission of said pulse signals to the microcomputer control.

18. The improvement set forth in claim 15 in which the pulse stretcher circuit that stretches the output pulses of the transient-creating and pulse width generating circuit means that contains said measuring coil comprises means for stretching the last-mentioned output pulses by a greater factor than the factor by which the output pulses of the transient-creating and pulse width generating circuit means that contains said reference coil are stretched by its pulse stretcher.

19. An electronic interface module for interfacing between a microcomputer control and an internal combustion engine governor of the type comprising a fuel control mechanism which includes a fuel injection pump, an electrically controlled positionable actuator for selectively modulating fuel flow from the injection pump to the engine in accordance with a fuel deliver control signal, and an eddy current sensor having a measuring coil for sensing position of said actuator and a reference coil for use in temperature-compensation of the measuring coil, said electronic interface module comprising control circuit means for transmitting the fuel deliver control signal to the governor as a pulse width modulated signal, and feedback circuit means for feeding back from the eddy current sensor to the microcomputer control a pulse width modulated feedback signal derived from both the measuring and the reference coils of the eddy current sensor, in which said module comprises a buffer circuit through which the fuel deliver control signal is transmitted to the governor, said module having an operative coupling of said buffer circuit to said feedback circuit means such that said pulse width modulated feedback signal is synchronized in phase with the fuel deliver control signal.

20. An electronic interface module for interfacing between a microcomputer control and an internal combustion engine governor of the type comprising a fuel control mechanism which includes a fuel injection pump, an electrically controlled positionable actuator for selectively modulating fuel flow from the injection pump to the engine in accordance with a fuel deliver control signal, and an eddy current sensor having a measuring coil for sensing position of said actuator and reference coil for use in temperature-compensation of the measuring coil, said electronic interface module comprising control circuit means for transmitting the fuel deliver control signal to the governor as a pulse width modulated signal, and feedback circuit means for feeding back from the eddy current sensor to the microcomputer control a pulse width modulated feedback signal derived from both the measuring and the reference coils of the eddy current sensor, in which said module comprises a buffer circuit through which the fuel deliver control signal is transmitted to the governor, said module having an operative coupling of said buffer circuit to said feedback circuit means such that said pulse width modulated feedback signal is synchronized in phase with the fuel deliver control signal, in which said module comprises transient-creating and pulse width modulating circuit means to generate respective pulses representative of the respective inductances of said measuring and reference coils, respective pulse stretcher circuits operating sequentially after said transient-creating and pulse width modulating circuit means for stretching the pulse widths of the respective pulses, and means for deriving said pulse width modulated feedback signal from the stretched widths of the respective pulses.

21. An electronic interface module as set forth in claim 20 in which one pulse stretcher circuit stretches the corresponding pulses by a greater factor than the other pulse stretcher circuit stretches its pulses.

* * * * *